(12) United States Patent
Singh et al.

(10) Patent No.: US 8,381,519 B2
(45) Date of Patent: Feb. 26, 2013

(54) METHOD OF STATIONARY REGENERATION OF AN ENGINE EXHAUST PARTICULATE FILTER

(75) Inventors: Nishant Singh, Carol Stream, IL (US); Liquan Xu, Aurora, IL (US); Jeremy Ventura, Chicago, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 689 days.

(21) Appl. No.: 12/611,155

(22) Filed: Nov. 3, 2009

(65) Prior Publication Data
US 2011/0099997 A1     May 5, 2011

(51) Int. Cl.
*F02B 33/44* (2006.01)

(52) U.S. Cl. ...... 60/605.2; 60/602; 60/295; 123/568.22; 701/108

(58) Field of Classification Search .................... 60/297, 60/272, 277, 292, 295, 324, 602, 605.2, 282; 123/568.22; 701/108
See application file for complete search history.

(56) References Cited

U.S. PATENT DOCUMENTS

| | | | |
|---|---|---|---|
| 7,469,177 B2 * | 12/2008 | Samad et al. | 701/54 |
| 7,788,922 B2 * | 9/2010 | Muller | 60/602 |
| 8,091,347 B2 * | 1/2012 | Hara et al. | 60/297 |

FOREIGN PATENT DOCUMENTS
WO   WO 2006092946 A1 *   9/2006

* cited by examiner

*Primary Examiner* — Ching Chang
(74) *Attorney, Agent, or Firm* — Mark C. Bach; Jeffrey P. Calfa

(57) ABSTRACT

A method of controlling an engine exhaust temperature and an exhaust mass flow rate for stationary regeneration of an engine exhaust gas particulate filter of an engine. The method implements a feed forward control that sets an EGR valve position and an injection timing associated with the engine, and a sets an engine speed. The method implements a feed back control that sets a turbo waste gate position and an intake throttle position associated with the engine.

8 Claims, 1 Drawing Sheet

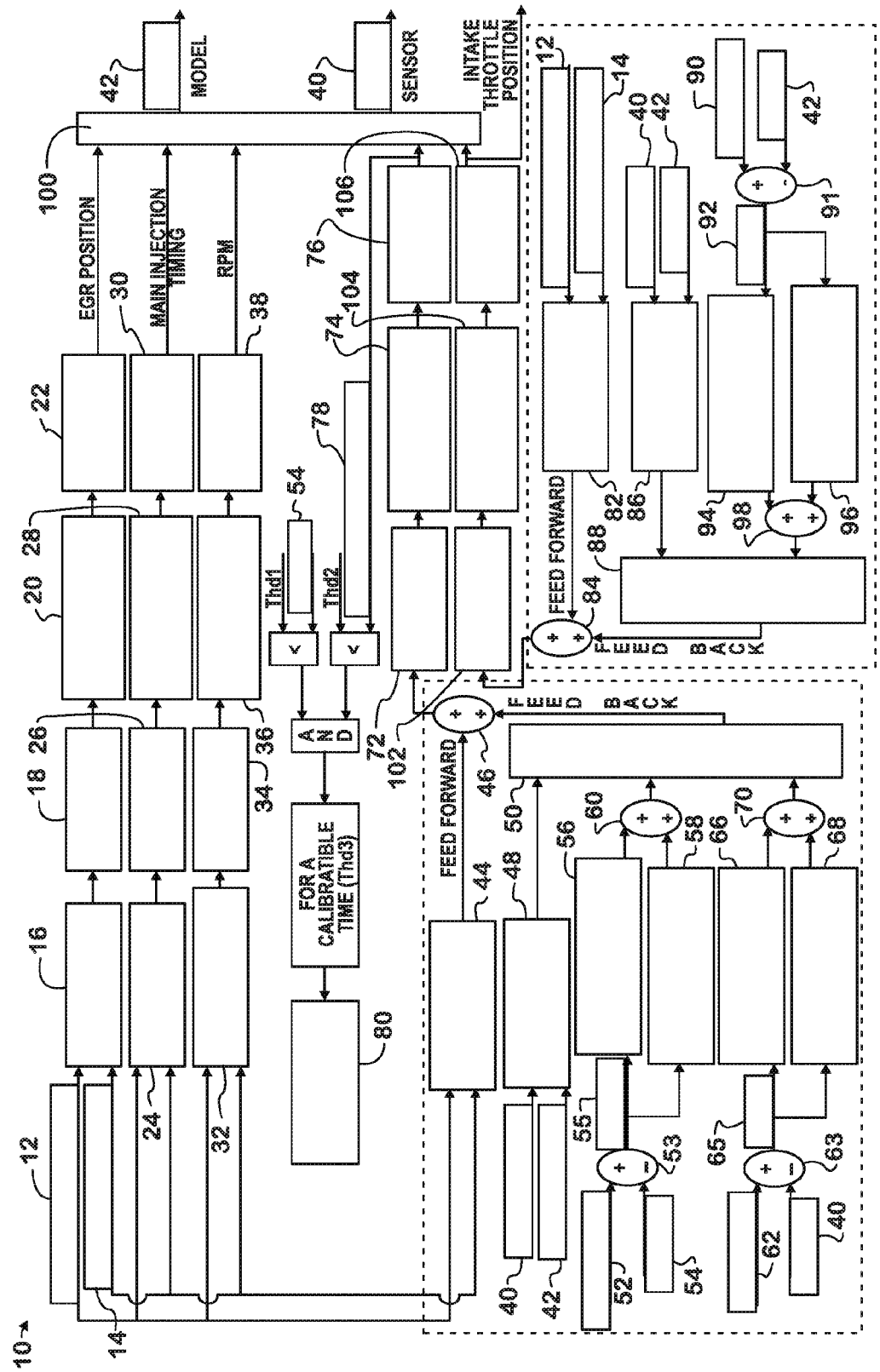

METHOD OF STATIONARY REGENERATION OF AN ENGINE EXHAUST PARTICULATE FILTER

TECHNICAL FIELD

The present patent relates to engine exhaust particulate filters, and more particularly to methods for regenerating the exhaust gas particulate filter in the exhaust of a diesel engine while a vehicle is stationary and an electronic control module to control the methods.

BACKGROUND OF THE INVENTION

Many factors, including environmental responsibility efforts and modern environmental regulations on engine exhaust emissions have reduced the allowable acceptable levels of certain pollutants that enter the atmosphere following the combustion of fossil fuels. Increasingly more stringent emission standards require greater control over both the combustion of fuel within the engine, and may require post combustion treatment of the exhaust. For example, the allowable levels of nitrogen oxides (NOX) and particulate matter have been greatly reduced over the last several years. To address, among other issues, environmental concerns, many diesel engines now have an exhaust particulate filter within an exhaust system of the engine purposed to reduce the amount of particulate matter released into the atmosphere.

In order to increase the service life of the exhaust particulate filter, an engine may be instructed by an engine control module to perform a regeneration cycle for the exhaust particulate filter that causes exhaust gas temperatures to rise to a level to regenerate the exhaust particulate filter by burning away trapped particulate matter. The regeneration cycle requires temperatures at the inlet of a diesel oxidation catalyst be at least a minimum temperature for proper regeneration of the exhaust gas particulate filter to avoid damaging the exhaust gas particulate filter. The minimum temperature at the diesel oxidation catalyst is required to ensure mixing and ignition of hydrocarbons injected for regeneration. In addition to requiring certain temperature conditions, the regeneration of the exhaust gas particulate filter also requires that the exhaust gas have a minimum mass flow rate in order to achieve proper regeneration. The exhaust particulate filter may require regeneration while the vehicle is stationary for many reasons, such as, the engine with the exhaust gas particulate filter in need of regeneration is subjected mainly to light loading conditions, the ambient temperature is low, aftertreatment parts have deteriorated based upon use, the engine is operating at speeds where air flow through the engine is low. Obtaining proper temperature and exhaust flow conditions for stationary regeneration of the exhaust gas particulate filter may be difficult to obtain.

Therefore a need exists for a method of performing stationary regeneration of an engine exhaust gas particulate filter that provides suitable conditions for regeneration.

SUMMARY OF THE INVENTION

According to one process, a method controls engine performance for stationary regeneration of an engine exhaust gas particulate filter. The method generates at least one of an EGR valve position setting, an injection timing setting, and an engine speed setting based upon an ambient temperature reading and an ambient pressure reading. The EGR valve position, the injection timing, and the engine speed are set based upon the at least one setting generated. The method obtains a first turbo waste gate setting from a memory based upon the ambient temperature reading and the ambient temperature reading. A second turbo waste gate setting is calculated based upon at least a first measured engine parameter. The method compares the first turbo waste gate setting to the second turbo waste gate setting to form a feed back control for the turbo waste gate setting. The turbo waste gate is positioned based upon the feed back control for the turbo waste gate setting.

According to another process, a method controls an engine exhaust temperature and an exhaust mass flow rate for stationary regeneration of an engine exhaust gas particulate filter of an engine. The method implements a feed forward control that sets an EGR valve position and an injection timing associated with the engine, and a sets an engine speed. The method implements a feed back control that sets a turbo waste gate position and an intake throttle position associated with the engine.

According to a further process, a method controls engine performance for stationary regeneration of an engine exhaust gas particulate filter. The method generates at least one of an EGR valve position setting, an injection timing setting, and an engine speed setting based upon an ambient temperature reading and an ambient pressure reading. At least one of the EGR valve position, the injection timing, and the engine speed are set based upon the at least one setting generated. The method obtains a first intake throttle position setting from a memory based upon a the ambient temperature reading and the ambient temperature reading. A second intake throttle position setting is calculated based upon at least a second measured engine parameter. The first intake throttle position setting is compared to the second intake throttle position setting to form a feed back control for the intake throttle position setting. The method positions the intake throttle position based upon the feed back control for the intake throttle position setting.

According to one embodiment, an electronic control module for an engine comprises a computer readable medium and a processor. The computer readable medium has a table for EGR valve position for diesel particulate filter regeneration based upon an at least one ambient condition, a table for injection timing for diesel particulate filter regeneration based upon at least one ambient conditions, a table for engine speed for diesel particulate filter regeneration based upon at least one ambient condition, a table for a turbo waste gate position for diesel particulate filter regeneration based upon at least one ambient condition, a table for an intake throttle position for diesel particulate filter regeneration based upon at least one ambient condition, a table for the turbo waste gate position for diesel particulate filter regeneration based upon at least one engine exhaust parameter, and a table for the intake throttle position for diesel particulate filter regeneration based upon at least one engine exhaust parameter. The processor generates a feed back loop for the turbo waste gate position and a feed back loop for the intake throttle position to control exhaust gas temperature and exhaust mass flow rate for regeneration of the diesel particulate filter. The feed back loops utilize at least one engine exhaust parameter.

Other features of the processes and embodiments will be apparent from the following specification taken in conjunction with the following drawings.

BRIEF DESCRIPTION OF THE DRAWINGS

To understand the present invention, it will now be described by way of example, with reference to the accompanying drawings in which:

FIG. 1 is a flow diagram depicting a method of controlling an engine for stationary regeneration of an exhaust gas particulate filter using an electronic control module.

DETAILED DESCRIPTION

While this process is susceptible of processes in many different forms, there is shown in the drawing and will herein be described in detail certain processes of the method with the understanding that the present disclosure is to be considered as an exemplification of the principles of the process and is not intended to limit the broad aspect of the method to the process illustrated.

According to one process as shown in FIG. 1, a method 10 of controlling an engine for stationary regeneration of an exhaust gas particulate filter is shown. The method is implemented by the electronic control module (ECM) of the engine. The process 10 receives a reading of an ambient temperature 12 and an ambient pressure 14 of an operating environment of the engine. The ambient temperature 12 and the ambient pressure 14 are used to control a variety of engine functions, including exhaust gas recirculation valve (EGR valve) position, injection timing, engine speed, turbo waste gate position, and intake throttle position, and the present process utilizes all of these engine functions to produce conditions needed for proper regeneration of an exhaust gas particulate filter, or diesel particulate filter (DPF).

Turning initially to the EGR valve, the process 10 receives the ambient temperature 12 and the ambient pressure 14 and generates an EGR valve position from a table stored on a memory or a computer readable medium of the ECM as shown at block 16. The EGR valve position being set based upon the table value contained in, or read by, the ECM is a so called feed-forward control, in that the reaction of the engine to the change in EGR valve position is not specifically monitored to cause further adjustment of the EGR valve position. After the EGR valve position has been generated, a delay period is calibrated, as shown at block 18 that indicates a time period that will pass prior to the EGR valve position being adjusted. This delay period may be based on current engine operating conditions, or external conditions, and helps prevent the EGR valve adjustment from adversely effecting engine performance. A period required to adjust the EGR valve from its current position to a position determined by the table value (block 16) is calculated at block 20. The process additionally determines maximum and minimum settings for the EGR valve, shown at block 22, to ensure that the EGR valve position is within appropriate limits. The ECM then generates instructions that cause the EGR valve position to be adjusted and the EGR valve of the engine 100 is adjusted accordingly.

Similarly to the EGR valve, the process 10 adjusts fuel injection timing based upon ambient temperature 12 and ambient pressure 14 and a fuel injection timing table stored on a memory or a computer readable medium of the ECM as shown at block 24. The fuel injection timing is set based upon the table value contained in, or read by, the ECM and is also a feed-forward control. After the fuel injection timing has been generated, a delay period is calibrated, as shown at block 26 that indicates a time period that will pass prior to the fuel injection timing being adjusted. This delay period may be based on current engine operating conditions, or external conditions, and helps prevent the fuel injection timing adjustment from adversely effecting engine performance. A period required to adjust the fuel injection timing from its current setting to a new setting determined by the table value (block 24) is calculated at block 28. The process additionally determines maximum and minimum settings for the fuel injection timing, shown at block 30, to ensure that the fuel injection timing is within appropriate limits. The ECM then generates instructions that causes the fuel injection timing of the engine 100 to be adjusted accordingly.

Like the EGR valve position and the fuel injection timing, engine speed is also controlled by the process 10 to create conditions appropriate for stationary regeneration of the DPF. Engine speed adjusts based upon ambient temperature 12 and ambient pressure 14 and an engine speed table stored on a computer readable medium of the ECM as shown at block 32. The engine speed is set based upon the table value contained in, or read by, the ECM and is also a feed-forward control. After the desired engine speed has been generated, a delay period is calibrated, as shown at block 34 that indicates a time period that will pass prior to the engine speed being adjusted. This delay period may be based on current engine operating conditions, or external conditions, and helps prevent the engine speed adjustment from adversely effecting engine performance. A period required to adjust the engine speed from its current setting to a new setting determined by the table value (block 32) is calculated at block 36. The process additionally determines maximum and minimum settings for the engine speed, block 38, to ensure that the engine speed is within appropriate limits. The ECM then generates instructions that causes the speed of the engine 100 to be adjusted accordingly.

While the engine 100 is running, the process 10 monitors engine exhaust temperature, shown at block 40, and calculates a mass flow rate of engine exhaust, shown at block 42. The exhaust temperature and the mass flow rate of the exhaust are utilized in feed-back control loops to adjust both a turbo waste gate position, and an intake throttle position, as will be described more fully below.

In addition to the EGR valve position, injection timing, and engine speed, the process 10 additionally adjusts the turbo waste gate position to create engine operating conditions appropriate for regeneration of the DPF. The process 10 receives the ambient temperature 12 and the ambient pressure 14 and generates a turbo waste gate position from a table stored on a computer readable medium of the ECM as shown at block 44. The turbo waste gate setting contained within the stored table is fed to a comparator 46 that is used with a feedback control loop.

In addition to the turbo waste gate setting based upon ambient temperature 12 and ambient pressure 14, the process 10 additionally generates a turbo waste gate position setting based upon a table generated utilizing the actual exhaust temperature 40, and the actual mass flow rate of engine exhaust 42. The turbo waste gate setting based upon the table of block 48 is sent to processor 50. As explained more fully below, the processor 50 is utilized to select a the turbo waste gate setting based upon feedback options.

In addition to a turbo waste gate setting based upon the actual exhaust temperature 40 and the mass flow rate of the exhaust 42, the process 10 generates a turbo waste gate setting based upon a proportional integral (PI) control loop to the turbo waste gate setting that controls boost pressure generated by the turbo. The PI control loop based upon boost pressure utilizes a target boost pressure, block 52, and a measured actual boost pressure, block 54, that are compared using a comparator 53 to generate a boost error, block 55, that is the difference between the target boost 52 and the actual boost 54. The boost error 55 is utilized to generate a proportional gain turbo waste gate setting, block 56, and an integral gain turbo waste gate setting, block 58. The proportional gain turbo waste gate setting 56 and the integral gain turbo waste gate setting 58 are used to create a PI control loop for the turbo waste gate based upon turbo boost pressure at block 60. The PI control loop based upon boost pressure, block 60, is sent to the processor 50.

In addition to the above described feed back loops for the turbo waste gate setting, the process 10 generates a turbo waste gate setting based upon a proportional integral (PI) control loop to control engine exhaust temperature. The PI control loop based upon engine exhaust temperature utilizes a target exhaust temperature, block 62 and a measured actual exhaust temperature, block 64, that are compared using a comparator 63 to generate an exhaust temperature error, block 65, that is the difference between the target exhaust temperature 62 and the actual exhaust temperature 64. The exhaust temperature error 65 is utilized to generate a proportional gain turbo waste gate setting, block 66, and an integral gain turbo waste gate setting, block 68. The proportional gain turbo waste gate setting 66 and the integral gain turbo waste gate setting 68 are used to create a PI control loop based upon exhaust temperature at block 70. The turbo waste gate PI control loop based upon exhaust temperature, block 70, is sent to the processor 50.

The processor 50 selects from the turbo waste gate setting based upon the actual exhaust temperature and exhaust flow rate, block 48, the PI control loop for the turbo waste gate based upon turbo boost pressure, block 60, or the turbo waste gate PI control loop based upon exhaust temperature, block 70. The processor 50 sends the selected turbo waste gate setting to the comparator 46 to be used as feed back for the turbo waste gate setting contained within the stored table generated at block 44.

A delay period is calibrated, as shown at block 72 that indicates a time period that will pass prior to the turbo waste gate being adjusted. This delay period may be based on current engine operating conditions, or external conditions, and helps prevent the turbo waste gate adjustment from adversely effecting engine performance. A period required to adjust the turbo waste gate from its current setting to a new setting (block 46) is calculated at block 74. The process additionally determines maximum and minimum settings for the turbo waste gate position, shown at block 76, to ensure that the turbo waste gate is within appropriate limits. The ECM then generates instructions that causes the turbo waste gate of the engine 100 to be adjusted accordingly.

In addition to controlling the turbo waste gate of the engine 100, the instructions for the turbo waste gate position 78 and the actual boost pressure generated by the turbo are utilized to generate a low boost pressure warning, block 80.

Finally, the process 10, in addition to the EGR valve position, injection timing, and engine speed, and the turbo waste gate position, controls an intake throttle position. The process 10 receives the ambient temperature 12 and the ambient pressure 14 and generates an intake throttle position from a table stored on a computer readable medium of the ECM as shown at block 82. The intake throttle setting contained within the stored table is fed to a comparator 84 that is used with a feedback control loop.

In addition to the intake throttle position setting based upon ambient temperature 12 and ambient pressure 14, the process 10 additionally generates an intake throttle position setting based upon a table generated utilizing the actual exhaust temperature 40, and the actual mass flow rate of engine exhaust 42. The intake throttle setting based upon the table of block 86 is sent to a processor 88. As explained more fully below, the processor 88 is utilized to select the intake throttle position setting based upon feedback options.

In addition to the intake throttle setting based upon the actual exhaust temperature 40 and the mass flow rate of the exhaust 42, the process 10 generates an intake throttle position setting based upon a proportional integral (PI) control loop to control the exhaust flow rate of the engine. The PI control loop based upon mass flow rate utilizes a target exhaust mass flow rate, block 90 and a measured actual exhaust mass flow rate, block 42, that are compared using a comparator 91 to generate a boost error, block 92, that is the difference between the target exhaust mass flow rate 90 and the actual exhaust mass flow rate 42. The exhaust mass flow rate error 92 is utilized to generate a proportional gain intake throttle position setting, block 94, and an integral gain intake throttle position setting, block 96. The proportional gain intake throttle position setting 94 and the integral gain intake throttle position setting 96 are used to create a PI control loop for the intake throttle based upon exhaust mass flow rate at block 98. The PI control loop based upon exhaust mass flow rate, block 98, is sent to the processor 88.

The processor 88 selects from the intake throttle position setting based upon the actual exhaust temperature and exhaust mass flow rate, block 86, or the PI control loop for the intake throttle position based upon exhaust mass flow rate. The processor 88 sends the selected intake throttle position setting to the comparator 84 to be used as feed back for the intake throttle setting contained within the stored table generated at block 82.

A delay period is calibrated, as shown at block 102 that indicates a time period that will pass prior to the intake throttle being adjusted. This delay period may be based on current engine operating conditions, or external conditions, and helps prevent the intake throttle adjustment from adversely effecting engine performance. A period required to adjust the intake throttle position from its current setting to a new setting (block 84) is calculated at block 104. The process additionally determines maximum and minimum settings for the intake throttle position, shown at block 106, to ensure that the intake throttle position is within appropriate limits. The ECM then generates instructions that causes the intake throttle position of the engine 100 to be adjusted accordingly.

Thus, the process 10 utilizes EGR valve position, injection timing, engine speed, turbo waste gate position setting, and intake throttle position to provide conditions suitable to allow regeneration of the DPF to occur in an efficient manner, even if the engine is not typically subjected to conditions during its duty cycle well suited for DPF regeneration.

The above process has been described in connection with an engine, more specifically a diesel engine, but is adapted to be used on many combustion process, such as electricity generating stations that utilize fossil fuels to generate electricity, manufacturing plant furnaces, building boilers, heating oil furnaces, and other sources of particulate matter from combustion of fossil fuels.

While the specific embodiments have been illustrated and described, numerous modifications come to mind without significantly departing from the spirit of the invention, and the scope of protection is only limited by the scope of the accompanying Claims.

What is claimed is:

1. An electronic control module for an engine comprising:
   a computer readable medium having a table for EGR valve position for diesel particulate filter regeneration based upon an at least one ambient condition, a table for injection timing for diesel particulate filter regeneration based upon at least one ambient conditions, a table for engine speed for diesel particulate filter regeneration based upon at least one ambient condition, a table for a turbo waste gate position for diesel particulate filter regeneration based upon at least one ambient condition, a table for an intake throttle position for diesel particulate filter regeneration based upon at least one ambient condition, a table for the turbo waste gate position for diesel particulate filter regeneration based upon at least one engine exhaust parameter, and a table for the intake throttle position for diesel particulate filter regeneration based upon at least one engine exhaust parameter;

a processor generating a feed back loop for the turbo waste gate position and a feed back loop for the intake throttle position to control exhaust gas temperature and exhaust mass flow rate for regeneration of the diesel particulate filter, the feed back loops utilizing at least one engine exhaust parameter.

2. The electronic control module of claim 1, wherein the at least one ambient condition is air temperature.

3. The electronic control module of claim 1, wherein the at least one ambient condition is atmospheric pressure.

4. The electronic control module of claim 1, wherein the at least one ambient condition is air temperature and atmospheric pressure.

5. The electronic control module of claim 1, wherein the at least one engine exhaust parameter is an exhaust temperature.

6. The electronic control module of claim 1, wherein the at least one engine exhaust parameter is an exhaust mass flow rate.

7. The electronic control module of claim 1, wherein the at least one engine exhaust parameter utilized by the feed back loop for the turbo waste gate position and at least one engine exhaust parameter utilized by the feed back loop for the intake throttle position are different.

8. The electronic control module of claim 1, wherein the processor additional having a comparator for comparing a turbo waste gate position setting determined by the ambient condition and the engine exhaust parameter.

* * * * *